United States Patent [19]

Nachtrieb

[11] 4,305,667

[45] Dec. 15, 1981

[54] APPARATUS, METHOD AND SYSTEM FOR VERIFYING THE ACCURACY OF PRINTED AND OTHER REPRODUCED MATERIAL

[75] Inventor: Robert W. Nachtrieb, Villa Park, Ill.

[73] Assignee: Fotel, Inc., Villa Park, Ill.

[21] Appl. No.: 125,392

[22] Filed: Feb. 27, 1980

[51] Int. Cl.³ .............................................. G01B 11/00
[52] U.S. Cl. .................................... 356/397; 356/384; 356/394; 356/243
[58] Field of Search ................. 356/71, 372, 384, 389, 356/390, 394, 397, 252, 243; 350/10

[56] References Cited

U.S. PATENT DOCUMENTS

| | | | |
|---|---|---|---|
| 1,135,919 | 4/1915 | Pilkington | 356/71 |
| 2,646,717 | 7/1953 | Selgin | 356/71 |
| 3,711,205 | 1/1973 | Tulk et al. | 356/389 |
| 3,942,896 | 3/1976 | Schneider et al. | 356/384 |
| 4,027,942 | 6/1977 | Fukushiga | 350/10 |
| 4,054,387 | 10/1977 | Whittome | 350/10 |
| 4,188,119 | 2/1980 | Schenk et al. | 356/252 |

Primary Examiner—R. A. Rosenberger
Attorney, Agent, or Firm—Neuman, Williams, Anderson & Olson

[57] ABSTRACT

An apparatus, method and system for verifying the accuracy of a sample of printed or other reproduced material. In the apparatus, a base is provided having a support surface for securing the reproduced sample to said surface, with a transparent support means slidably lying contiguous to the support surface. A transparent master symbol for verifying the accuracy of the reproduced material is secured to the underside of the support means so that the master symbol and reproduced sample are contiguous. Preferably, the image on said transparent master symbol is interrupted to provide open spaces to facilitate visual comparison with the reproduced sample. In operation, the sample is aligned with the master symbol to verify its accuracy. In the event that a portion of the reproduced sample and master symbol are not in alignment, the master may be moved to align said portion and the movement can be measured to determine the error in reproducing the sample.

12 Claims, 18 Drawing Figures

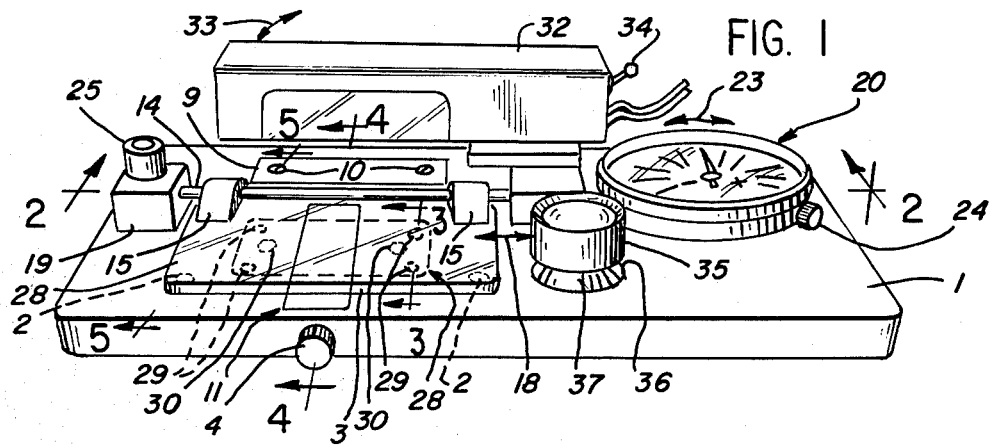
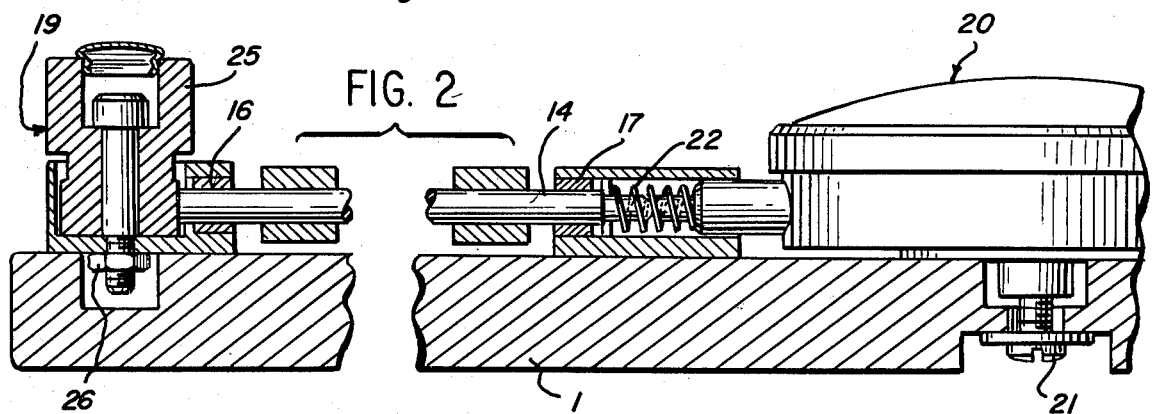
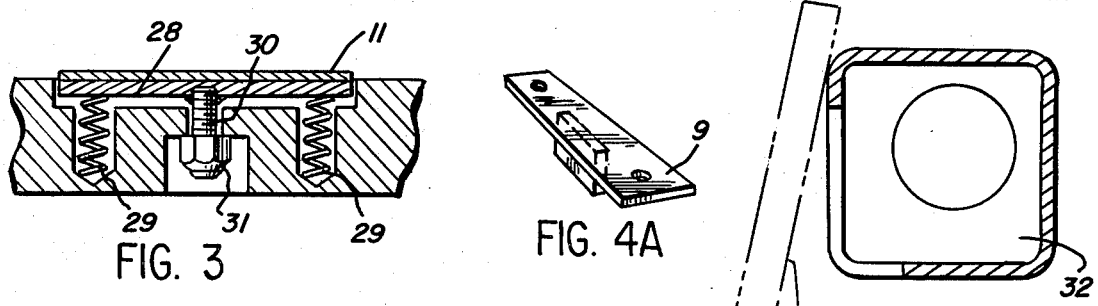
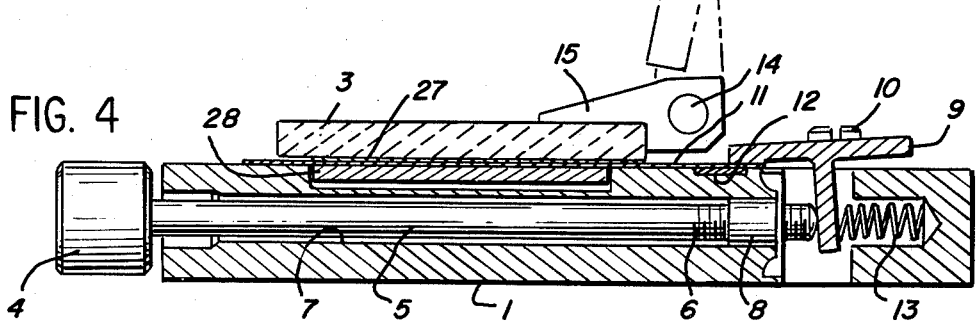
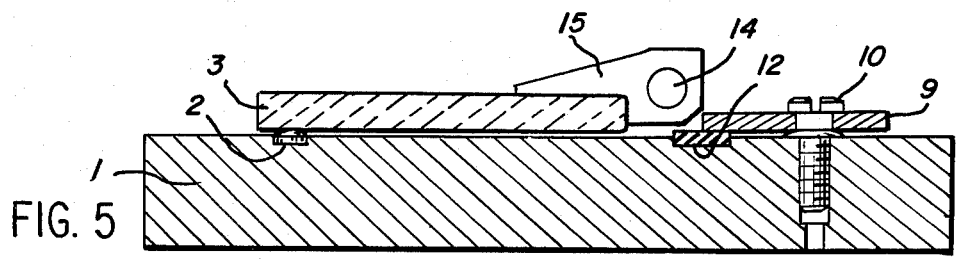

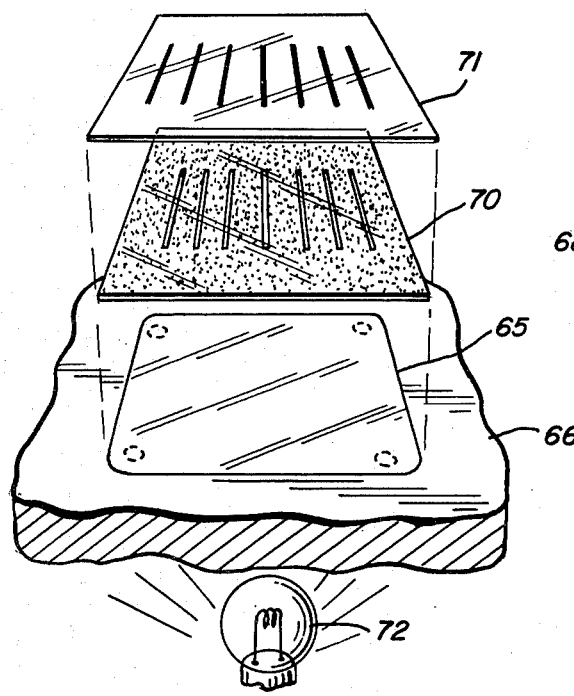
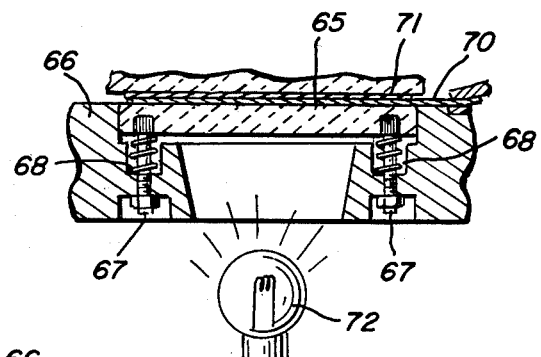
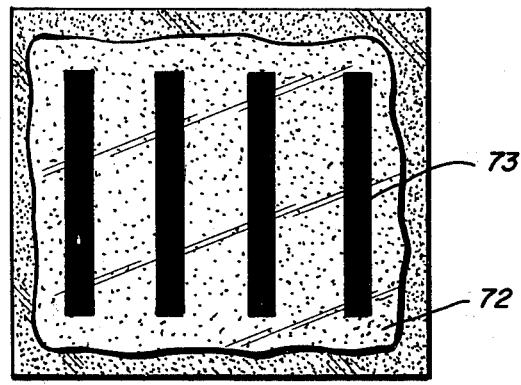
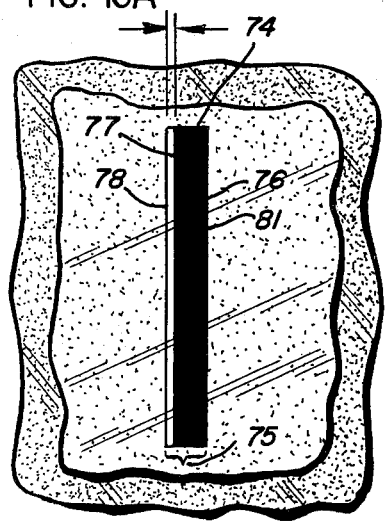
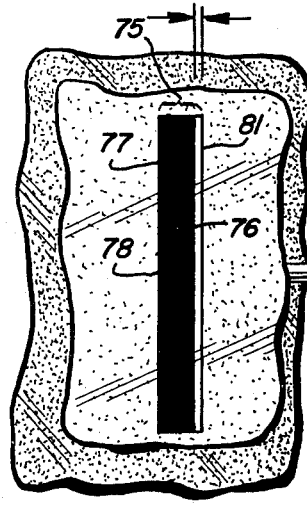
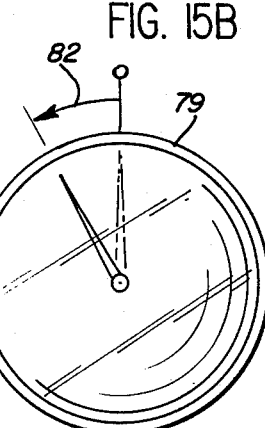

APPARATUS, METHOD AND SYSTEM FOR VERIFYING THE ACCURACY OF PRINTED AND OTHER REPRODUCED MATERIAL

BACKGROUND OF THE INVENTION

It is the purpose of this invention to provide an improved apparatus, system and method for verifying the accuracy of printed and other reproduced material. In particular, this invention is especially applicable for determining the accuracy of printed material employed for data storage and similar technologically demanding applications. Several particular applications of the invention in the field of data recording and retrieval will be described in detail.

One difficult task frequently encountered in the field of data recording, particularly in the retail sales industry, is the rapid identification of a large number of items. In retail grocery stores, for example, there is a large cost associated with charging or "checking out" retail sale items correctly and expeditiously. When reading price labels, clerks frequently make mistakes, or if a price label on an item is lost, a substantial amount of time is wasted ascetaining the correct price.

In response to this problem, the retail sales industry has accepted and has begun using successfully for some time a manner of identifying items with a Universal Product Code (UPC). This code can be automatically read by an optical scanner. These codes are now being used in supermarkets and other retail areas, although their use is not limited to the retail field. For example, such codes can be used to identify blood samples, library books or the like.

As a supermarket clerk is checking out an item, the Universal Product Code printed on the item is moved relatively to an optical scanner that emits a beam of light and records the reflectance of portions of the Universal Product Code. From its pattern of reflectance, the scanner can read the imprinted code. The scanner is usually equipped with a memory so that it can compare the identified code with items of stored information. One piece of stored information would usually be the price of the item. In addition to storing a price record of the item, the scanner can also keep a record of each item that is purchased, with the aim of keeping an accurate control over inventory.

Since the adoption of the Universal Product Code, more and more businesses are using them, and they are generally credited with saving a great deal of time and expense in the retail field.

The printed Universal Product Code itself comprises a number of thin, parallel bars of varying thickness, which are typically printed on the outside of a package containing the item to be identified. In a typical printing operation, a printer is supplied with "master" Universal Product Code. This master is normally either a positive or negative of the desired code which is accurately reproduced on a transparent film. In a usual master Universal Product Code that is supplied to a printer, a certain amount of "bar width reduction" is built into this master. In other words, the bars on the master supplied to the printer are reduced in width, that is, they are thinner than would be required on a printed copy. The amount of bar width reduction depends on the particular printing operation; for example, the required reduction might depend on the extent the ink might be expected to spread during a particular printing operation. This bar width reduction is frequently in the range of about 0.003 inches per bar; it may be higher or lower, depending on the printer's requirements and techniques but the bar width reduction is always the same for each bar on a given code.

The dimensions of the printed code, in a direction perpendicular to the bars, is typically 1½ inches. The height of the bars is typically 1 inch. This is what is called a code of "nominal" size. The code, however, may vary from 80 percent to 200 percent of nominal size without causing any problem with the optical scanner.

A serious problem occasionally arises when the optical scanner, for one reason or another, is unable to read a given code and "rejects" the item. This problem, when it occurs, is a great inconvenience in a retail grocery store, since a check-out clerk will be required to manually verify the price of the item rejected, and inventory data may lose its integrity. The problem has usually been caused by an inaccurate replication of the bar code during printing.

The inaccuracy that is most likely to occur, and which gives the most frequent problem with scanners, is an inaccurate replication of the width of each bar. Sometimes the code may be printed with one or more bars being thinner than they should, while at other times one or more bars may be wider than they should be. Whether or not a given code is printed correctly may depend on many factors that can be controlled during printing, such as the speed of printing, the temperature of the ink, the type and viscosity of the ink used, the printing pressure and related factors. And the accuracy of the printed Universal Product Code is only as good as the master symbol provided to the printer.

Because of the problem of rejecting or misreading items, industry has set standards for printed Universal Product Codes, which, hopefully, printers will be able to follow. It has been found that the width of the bars is crucial with respect to reading the code.

For a code of nominal size, that is $1'' \times 1\frac{1}{2}''$, the printed bars may be wider or thinner than the ideal by an amount exceeding no more than approximately 0.0040 inch. For a code printed 80 percent of nominal size, the tolerance becomes smaller, that is about 0.0014 inch, while for a code printed 200 percent of nominal size, the tolerance can be as great as 0.010 inch. As mentioned above, the bars on a given code maay be of varying thickness, and the above tolerances are for all bars without regard to their thickness.

With respect to the master symbol that is supplied to the printer, a higher degree of accuracy is required. Manufacturers of master symbols typically produce masters with a ±0.0002 inch tolerance in the width of each bar. That is, a bar may be thicker or thinner than that amount as compared to an ideal bar. This very low tolerance is, unlike the tolerance permitted for a printed sample, not dependent upon the size of the Universal Product Code. The permitted tolerance is the same for a code of nominal size as for a code 200% of nominal size. Although the permitted tolerance is much less for master symbols than for printed Universal Product Codes, because master symbols are usually prepared more carefully and under more controlled conditions, the higher degree of accuracy is usually not as difficult to accomplish as when producing printed Universal Product Codes for use on actual products.

Reproducing printed Universal Product Codes to acceptable tolerances has presented a problem for the printing industry primarily because there is no rapid, inexpensive way for a printer to determine whether a printed code falls within acceptable levels of tolerance. Producing master symbols that are used for preparing printing plates of the required degree of accuracy is also a problem because there is no rapid way of determining whether the Universal Product Code bars on a master symbol are reproduced within the required very low tolerance.

Thus, there is a need in the field for an inexpensive apparatus and method that can be used to rapidly determine if a printed Universal Product Code falls within acceptable levels of tolerance. Most desirably, such an apparatus should be usable in a printing shop so that an operator can rapidly determine if a given code is within tolerance. If it is not, he maay of course desirably adjust his printing techniques to correct the problem.

There is also a need in the field for an inexpensive apparatus and method that can be used to determine if a master symbol Universal Product Code is reproduced with the required degree of accuracy. This apparatus and method should, of course, be capable of determining whether a given Universal Product Code bar on the master is reproduced to the required ±0.0002 inch accuracy.

It should be realized that, unlike other verification devices that provide the means for rejecting or accepting the bar code symbol by a scanner, this device is directed to determine if all bar widths fall within the specifications set for the particular symbol magnification in test.

OBJECTS AND DESCRIPTION OF THE INVENTION

It is an object of the invention to provide an apparatus, method and system that can be used to quickly and inexpensively verify the accuracy of printed and other reproduced material.

It is a further object of the invention to provide an apparatus, method and system that can be used to quickly and inexpensively verify the accuracy of a printed Universal Product Code.

It is a still further object of the invention to provide an apparatus, method and system that can be used to quickly and inexpensively verify the accuracy of a Universal Product Code master symbol.

It is a still further object of the invention to provide an apparatus, method and system that can be used to determine whether a Universal Product Code is printed within a given dimensional tolerance.

It is a still further object of the invention to provide an apparatus, method and system that can be used to verify the accuracy of a master Universal Product Code to within a given dimensional tolerance.

It is a still further object of the invention to provide a special master Universal Product Code symbol which can be easily and effectively used to verify the accuracy of a symbol master and a printed code, and function with the apparatus of this invention as a unique system to determine the accuracy of said symbol master and said printed code.

These and other objects of the present invention will become apparent from the following specification, accompanying drawings and the appended claims.

In one embodiment of the apparatus of the invention, a base is provided with means to mount a printed Universal Product Code securely to the supporting surface of the base. A rectangular transparent support plate lies slidably above the printed code, and a transparent verification master symbol is secured to the underside of the plate. The printed symbol and the verification master symbol are in close contact, and a spring loaded pressure plate is provided in the base to ensure close contact. The verification master symbol itself comprises a clear, plastic film on which the Universal Product Code to be tested is reproduced.

Normally, the bars of the printed sample and those of the verification master will be substantially parallel. To facilitate visual comparison of the verification master with the sample, a means is provided to ensure that the support plate slides in a linear manner and in a direction perpendicular to the bars. A dial indicator gauge is secured to the base, and is connected to a sliding plunger or shaft, which in turn is either operably connected to or resiliently abutting the support plate, so that the dial indicator gauge records any movement of the support plate, and thus, of the verification master symbol. A means is provided to move the plate a discrete amount in one direction, with the dial indicator normally being spring loaded to move the plate in the other direction.

A unique transparent verification master Universal Product Code symbol is provided which can be used in the above described apparatus. In one embodiment, it comprises a thin, transparent, plastic film, usually a polyester, on which dashed, interrupted or broken UPC bars are replicated. The bars are purposely interrupted to facilitate visual comparison with the continuous bars on the sample. It should be noted tht this verification master symbol is made with no bar width reduction, since it will be compared directly to the printed sample. Rather, the Universal Product Code bars on it should be the precise width that should be expected from an accurately printed sample. Both the verification master and the printed sample are of the same size and are encoded to represent the same number pattern.

To operate the apparatus, a sample printed Universal Product Code is securely attached to the base, with the support plate laid over the printed copy. The above-described verification master symbol with interrupted Universal Product Code bars is secured to the underside of the support plate. As mentioned above, the bars of the verification master and those of the printed sample are adjusted to be substantially parallel.

The operator, by moving the support plate in a direction perpendicular to the direction of the Universal Product Code bars, will align corresponding edges of corresponding bars on the printed sample with corresponding edges of corresponding bars on the verification master symbol to verify the width of the bars on the printed sample. Any difference in the width of the bars on the printed copy with respect to corresponding bars on the verification master can be measured by aligning corresponding edges of a set of corresponding bars, setting the dial indicator gauge to "zero" (or any known value), moving the support plate until the other edges of the bars are in alignment, and reading the dial indicator gauge.

Another embodiment of the invention is used to determine the accuracy of a master Universal Product Code that is supplied to printers. This code is usually reproduced having the bar width reduction required by the particular printing operation. In this embodiment the apparatus is similar to that described above except that the spring loaded pressure plate is composed of a transparent material with a light source mounted underneath it. The dial indicator gauge is more accurately calibrated, in ten thousandths of an inch.

In this embodiment, the master Universal Product Code to be tested as well as the verification master are both reproduced as transparencies. For ease of comparison, one should be a reversal image of the other, that is, the verification master should be a positive and the master code to be tested should be a negative. As mentioned above, either a negative or a positive might be supplied to the printer, but whichever is to be supplied to the printer should, of course, be reproduced with the required bar width reduction. To use this apparatus and method, the verification master should usually have no bar width reduction.

To operate this apparatus to verify the accuracy of a master Universal Product Code, a positive master symbol to be tested is first secured to the base, and a negative verification master symbol is secured to the underside of the support plate. The bars of each are adjusted to be substantially parallel, and the light source under the spring loaded pressure plate is activated so that the operator caan visually compare the two transparencies. The operator, by moving the support plate in a direction perpendicular to the direction of the Universal Product Code bars will then align corresponding edges of corresponding bars on the two master symbols. Light should be totally extinguished when the bars are registered. This is so since, as mentioned above, one master is a negative while the other is a positive symbol. Any encodation difference between the bars will, of course, be immediately noticeable. Discrete bar edge misalignment due to non-uniform bar width reduction can be measured with the dial indicator gauge as discussed above.

It should be noted that there are several reasons for employing a negative and positive master symbol when using this method. The first is what might be called the "venetian blind effect." That is, when a negative and positive of the same image are viewed over a light source, the total extinction of light causes the eye to become extremely sensitive to any small amount of light that might not be blocked. This phenomenon is of importance here since it is what permits a viewer to perceive the small, i.e., 0.0002 inch difference in thickness in bars that is required for a master symbol.

Another principal that is of importance when verifying the accuracy of master symbols is what is called the "panorama effect." It is simply the utilization of the venetian blind effect when viewing the entire Universal Product Code without magnification. It permits the total number of bars to be checked simultaneously without laboriously checking each bar individually with a magnifying glass. Thus, an errant bar will be expeditiously discerned as it "signals" a tell-tale "crack" of light in advance of the other bars.

For a more complete understanding of the invention, reference will now be made to the accompanying drawings and a more detailed description of the invention.

DESCRIPTION OF THE DRAWINGS

FIG. 1 is a perspective view of the preferred embodiment of the invention.

FIG. 2 is a partial sectional view of the apparatus of FIG. 1, taken at lines 2—2 thereof.

FIG. 3 is an enlarged partial sectional view of the apparatus of FIG. 1, taken at lines 3—3 thereof.

FIG. 4 is an enlarged partial sectional view of the apparatus of FIG. 1, taken at lines 4—4 thereof.

FIG. 4A is an enlarged view of the rocking clamp 9 shown in FIGS. 1, 4 and 5.

FIG. 5 is an enlarged partial sectional view of the apparatus of FIG. 1, taken at lines 5—5 thereof.

FIG. 12 is a diagrammatic illustration of a positive verification master master symbol superimposed over a negative master symbol.

FIG. 13 is an enlarged sectional view of pressure plate 28 of another embodiment of the invention.

FIG. 14 is an enlarged view of a section of a positive Universal Product Code verification master symbol superimposed over a negaive Universal Product Code master symbol.

FIGS. 15A and 15B are enlarged views of a section of a positive Universal Product Code verification master symbol superimposed over a negative Universal Product Code master symbol.

DESCRIPTION OF THE PREFERRED EMBODIMENT OF THE INVENTION

Figure 6:
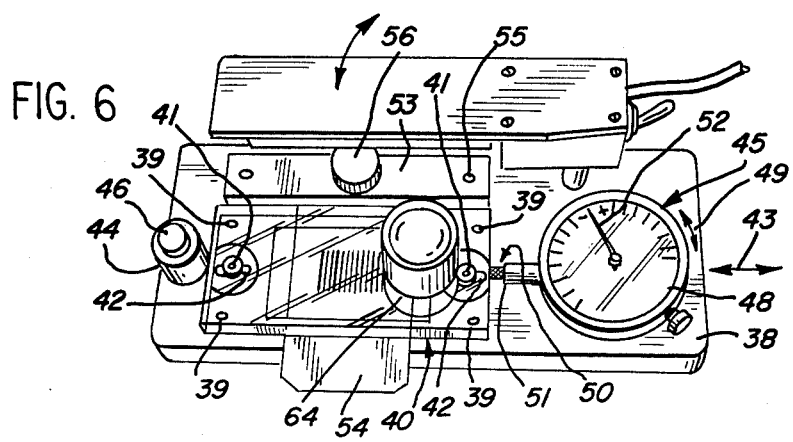
FIG. 6 is a perspective view of another embodiment of the invention.

The preferred embodiment of the invention for verifying the accuracy of printed material is shown in FIG. 1. Sectional views of this apparatus are shown in FIGS. 2, 3, 4 and 5.

This embodiment includes a base 1 having a supporting surface. Cemented or otherwise secured to the supporting surface are two smooth, plastic pads 2 for supporting a transparent supporting plate 3, typically constructed of plate glass or the like.

The printed sample 11 to be tested is secured to the supporting surface, as will be discussed more fully below. It should be understood that this printed sample may be taken at random from the run of a press in order to determine the precision of the printed product. Precision is especially important in modern printed products used for data storage and retrieval.

Clamp means, shown in FIG. 1 and in more detail in FIGS. 4, 4A and 5, is provided to secure the printed sample to the supporting surface of the base. It comprises a knob 4 mounted on the front of the base, connected to a shaft 5 that is threaded 6 at one end. The shaft is fitted into a hollow portion 7 of the base and is screwed into a corresponding threaded female receiving means 8 fitted into the base. One end of the shaft abuts a rocking clamp 9 connected to the base with two screws 10. The rocking clamp is shown in an enlarged view in FIG. 4A.

As the knob 4 is turned in one direction, it provides force on the rocking clamp, which tends to tightly secure the printed sample 11 to the base. A soft pad 12, constructed of cork or the like, is secured to the base to ensure good contact of the sample with the support surface of the base. When it is desired to loosen the sample, the knob is turned the other way, and spring 13 tends to force the rocking clamp in such a way as to loosen the sample for removal.

The support plate in this embodiment is secured to the base by a shaft 14, being cemented or otherwise secured to the plate with two hinges 15. Both ends of the shaft are slidably and rotatably secured to the base with two sleeves 16 and 17 (shown in FIG. 2). The function of the shaft and hinges is to ensure that movement of the support plate is confined to a substantially linear direction of motion as shown in FIG. 1 by arrow 18. One end of the shaft is connected to a driving cam 19 and the other end to a dial indicator gauge 20. It should be noted that the support plate of this embodiment can easily be raised, as shown with dashed lines in FIG. 4, to facilitate removal of the printed sample as well as the transparent master symbol.

The dial indicator 20 is secured to the base with screw 21, and includes a spring 22 to maintain force on the shaft in the linear direction 18 towards the driving cam 19. The dial indicator has a bezel that caan be rotated in either direction as shown by arrow 23 and locked into a given position by turning knob 24. This dial indicator is one that is generally available in the field and is designed so that any lateral movement in the shaft is translated into a movement of the needle. The dial indicator is calibrated every five ten thousandths of an inch, and is further calibrated with markings showing the tolerance permitted for any given code size. For example, the dial shows markings for the permitted deflection for a "nominal" size code, for an 80%, and a 200% size code, etc.

The driving cam 19 is shown in more detail in FIG. 2. It translates the rotational movement of knob 25 into the linear movement of shaft 14. The cam is secured to the base with screw and bolt as shown 26.

The preferred position of the sample 11 is with the bars of the printed Universal Product Code substantially perpendicular to the direction of the axis of the shaft 14. The verification master symbol 27 (shown in FIG. 4) will be discussed in more detail below. It is secured, preferably pinned to the bottom surface of the glass 3. As shown in more detail in FIG. 3, a metal pressure plate 28 is installed in a recessed area in the base, with four springs 29 between the pressure plate and the base. The springs function to maintain an upward force on the pressure plate and thus serve to urge the pressure plate 28 against the support plate 3 to keep the printed sample in close contact with the verification master symbol. The plate is kept in place on the base with two bolts 30 connected to the plate. The bolts 30 are threaded with nuts 31 from the underside of the base.

Figure 7:
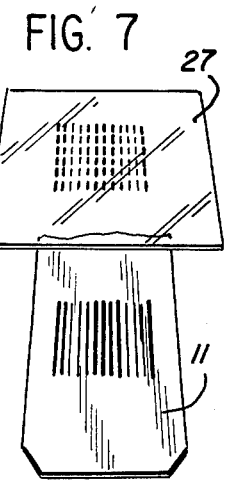
FIG. 7 is a diagrammatic illustration of a printed sample and a verification master symbol as they are superimposed as part of the system in use with the embodiments of either FIG. 1 or FIG. 6.

As mentioned above, the verification master symbol is superimposed over the sample with the Universal Product Code bars of the verification master substantially parallel to those of the sample. The superimposition of the master 27 over the sample 11 is shown in FIG. 7.

A fluorescent light 32 or the like is provided to facilitate viewing the sample. The light is mounted on a post (not shown). A switch 34 is provided to turn the light on or off.

A recess 36 is provided in the base to safely store a magnifying glass 35 when not in use. Although shown in the recess, the magnifying glass 35 can be placed on the surface of the glass to facilitate viewing the sample, and comparing it with the verification master. This magnifying glass has a clear base 37 which supports it on the surface of the support plate, and at the same time, permits light to shine on all areas of the printed Universal Product Code.

Figure 8:
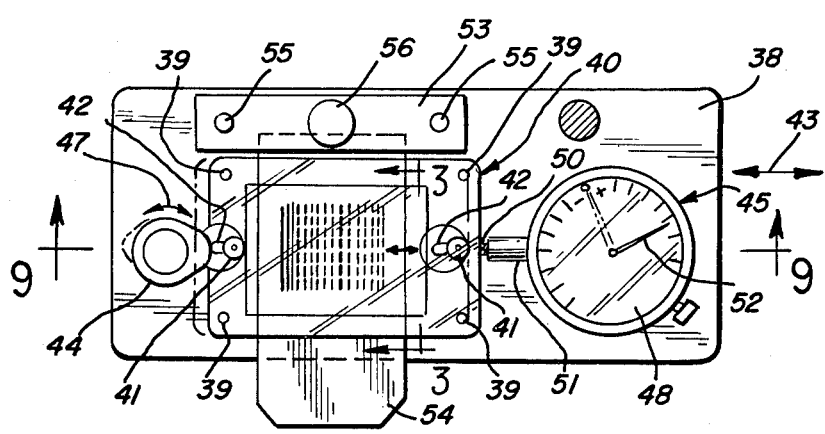
FIG. 8 is a top view of the apparatus shown in FIG. 6.
Figure 9:
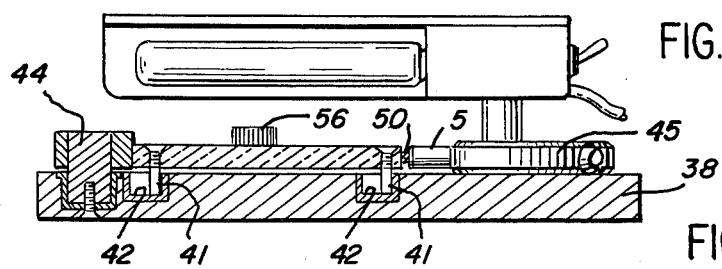
FIG. 9 is a partial cross-section of the apparatus of FIG. 6, taken at lines 9—9 thereof.

In FIG. 6, another alternate embodiment of the apparatus for verifying the accuracy of printed material is shown as it appears from above in perspective view. A top view of the apparatus is shown in FIG. 8, and a sectional view is shown in FIG. 9.

This apparatus also includes a base 38 having a support surface. Cemented to the support surface are four smooth, plastic pads 39 for supporting a transparent supporting plate 40, typically constructed of plate glass or the like. Two metal guide pins 41 (shown in more detail in FIG. 9) are secured, preferably cemented, to the bottom surface of the transparent support plate 40. The guide pins project in the downward position, and engage corresponding rectangular grooves 42 cut into the base 38 of the apparatus. The grooves are cut parallel to the direction shown 43 so that the support plate can be moved in a linear direction 43 without any substantial perpendicular deviation. The support plate can, of course, be removed from the base by simply raising it from the support surface.

A driving cam 44 is mounted on the base in contact with one edge of the support plate. The cam is designed to move the plate in a direction towards the dial indicator 45, parallel to the direction shown by arrow 43, by turning a knob 46 mounted on the cam. The knob may be turned in either direction, as shown 47. The dial indicator includes a spring means (not shown) to drive the support plate in the opposite direction and maintain the plate against cam 44.

The dial indicator 45 of this embodiment is similar to that described above. It has a bezel 48 that can be rotated in either direction, as shown by arrow 49. The dial indicator is mounted on the base 38 and has a longitudinally movable plunger 50, slidably mounted in a sleeve 51, movable in a linear direction, as shown by arrow 43. One end of the plunger 50 is contiguous with one edge of the support plate. The other end of the plunger is operably connected to the dial indicator 45.

The dial indicator is one that is generally available in the field and is designed so that any lateral movement in the plunger 50 is translated into a movement in the needle 52. This movement is shown more clearly in FIG. 8. One position of the cam, the support plate and the needle on the dial indicator is shown in interrupted lines, while aother position is shown in solid lines.

The dial indicator of this embodiment is calibrated in the same way that the dial indicator on the preferred embodiment is calibrated.

A bar clamp 53 or other means to clamp a printed sample Universal Product Code to be tested 54 is securely held to the base by the two posts 55 and by a manually engageable clamp tightening screw 56. The printed sample 54 is placed between the support surface of base 38 and the support plate 39 and secured to the support surface of the base by turning the clamp tightening screw 56, which brings the clamp in contact with the sample. A magnifying glass 64, similar to the magnifying glass discussed above, is shown resting on the support plate in FIG. 6, as it would appear when comparing the printed sample to the verification master Universal Product Code.

Figure 10:
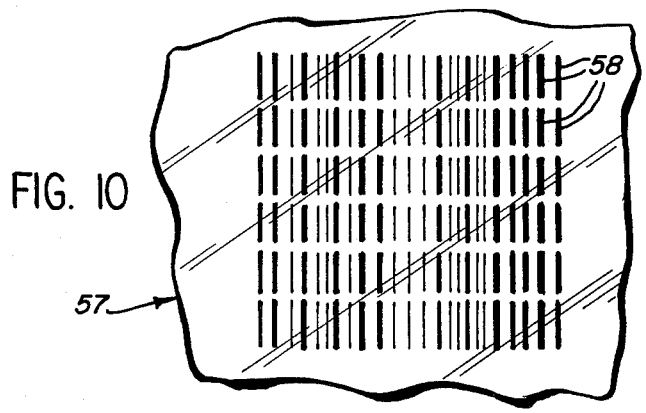
FIG. 10 is a view of the verification Universal Product Code master symbol.

An enlarged view of the verification master symbol 57 is shown in FIG. 10. It can be used to verify the accuracy of a printed Universal Product Code in both of the above-described embodiments. The verification master is made of a thin, transparent material, such as plastic or the like, and is preferably custom made for each printing job. Some of the Universal Product Code bars are shown in FIG. 10, and as can be seen, are replicated as interrupted, rather than continuous, bars. The verification master is equipped with interrupted bars to facilitate the visual comparison of the thickness of the solid bars on the printed copy with the ideal thickness as represented by the interrupted bars on the verification master. It should be noted that this verification master is reproduced without any bar width reduction since it will be compared directly with the printed sample.

Following is a description of the method of operation of the verification device of the preferred embodiment of the invention. It should be understood that the operation of the alternate embodiment is similar. To operate the apparatus, the operator first secures the printed Universal Product Code code to be tested 11 under clamp means 9 by turning knob 4, as shown in FIGS. 1 and 4. The verification master symbol 27 is secured to the underside of the glass support plate. The printed sample and the verification master symbol are superimposed, as shown in FIG. 7, with the bars of both substantially parallel.

To determine whether a UPC bar on the printed sample is of a proper width, the operator first aligns the edge of a Universal Product bar on the sample with the corresponding edge of the corresponding bar on the verification master symbol by turning the knob 25 on the cam 19, and thus, moving the support plate to the right or left. To facilitate this comparison, the operator may of course use the magnifying glass 35.

Figure 11A:
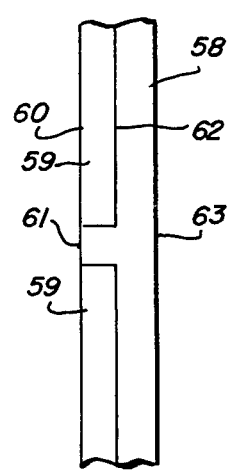
FIGS. 11A and 11B are enlarged views of a section of a printed Universal Product Code shown with a superimposed verification master symbol.
Figure 11B:
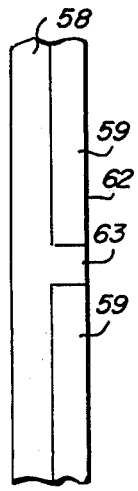

FIG. 11a shows in more detail the situation that arises where the printed bar 58 is wider than the interrupted verification master bar 59. Note that in FIG. 11A the left edge 60 of the verification master bar 59 is aligned with the left edge 61 of the corresponding bar 63 on the printed sample. When aligned, as shown in FIG. 11A, the operator rotates the bezel on the dial indicator so that the needle reads "zero" deflection. If, by visual inspection, the other edge 62 of the verification master bar is not aligned with the corresponding edge 63 on the printed sample, as shown in FIG. 11A, the operator carefully rotates the knob on the cam and moves the glass support plate in a direction towards the dial indicator until the opposite edges 62, 63 of the bars are aligned, as shown in FIG. 11B. The operator then reads the deflection on the dial indicator to determine whether the width of the sample bar is within the allowed tolerance.

The operator may repeat this process for each bar on the printed sample. However, a quicker method would be to inspect, say the left edges of all printed and verification master bars after aligning one set. Repeat this action for right edges. Thus, measuring this deviation for one set accomplishes effectively the measuring of all bars—a saving in time of 30 to 1. In this way, he can quickly determine whether the sample is printed within the abovementioned allowed tolerances.

It should be understood that this method can similarly be employed in a situation where the printed bar is narrower than a corresponding bar on the master symbol. In that situation, the operator similarly aligns the left edge of the bar on the printed sample with the corresponding edge on the corresponding bar on the verification master symbol and then adjusts the dial indicator to zero. The operator then turns the cam to permit the spring in the dial indicator to move the support plate and the master symbol until the opposite edge of the bars are aligned. The deflection in this case can again by similarly read from the dial indicator, but will now be a negative, rather than positive, value.

The apparatus that can be used to verify the accuracy of a master symbol that would be supplied to a printer is similar to that shown in FIGS. 1-5. The only difference relates to the construction of pressure plate 28 shown in FIG. 3. To measure the accuracy of a master symbol, this pressure plate must be constructed of a transparent material such as plate glass or the like, and must be designed to permit light to shine through the plate to facilitate the comparison of the two transparent master symbols. Such a plate 65 is shown in FIG. 13. FIG. 13 is a view taken along 5—5 of FIG. 1 except that the supporting bolts 30, which are shown on FIG. 13, are rearranged to facilitate the passage of light through the plate.

Referring again to FIG. 13, the transparent pressure plate 65 is secured to the base 66 by four bolts 67, each in the corner of the plate, only two of which are shown in the side view of FIG. 13. Four springs 68 are placed between the base and the pressure plate and serve to urge the pressure plate against the support plate 69 to keep the master symbol 70 to be tested in close contact with the verification master symbol 71. A light source below the base 72 is shown. It can be provided by simply placing the entire apparatus over a light table.

Following is a description of the method of verifying the accuracy of a master Universal Product Code. As noted above, the apparatus employed is that shown in FIGS. 1, 2, 4, 4A, 5 having the modified transparent pressure plate as shown in FIG. 13. The operaor first secures the master symbol to be tested to the support surface of the base. The operator then secures the verification master symbol to the support plate. FIG. 12 shows the positive verification master symbol 71 superimposed on the negative master symbol to be tested. As shown in FIG. 12, the master symbol to be tested is shown as a negative while the verification master is shown as a positive. In the usual case, a negative master is supplied to the printer, but a positive can be obtained by contact printing from the negative. Transparent pressure plate 65 is shown mounted on base 66.

When the underlying light source is activated, and the edges of the corresponding bars are aligned by turning knob 25 on the cam 19, there should be no light visible if the bars on the master symbol to be tested are accurately reproduced. If all bars are determined to each simultaneously produce a "crack" of light upon sliding the verification master to the left and right in order to bring right edges together and the left edges together, and, further, if the total movement as indicated on the dial indicator does not exceed the parameters indicated fo the symbol size being tested, the printed symbol is within specification. The situation where the edges are in alignment is shown in FIG. 14. The darkened portion of the underlying negative master symbol to be tested 72 is shown as a dotted area. No light is transmitted through this area, nor is any light emitted through superimposed bar 73 of the positive verification master from the corresponding edges of the corresponding bars.

In the event that perfect alignment is not obtained, the apparatus can be used to measure the variation in the width of the bars. FIGS. 15A and 15B show in more detail the situation that arises when one positive bar 74 is narrower than the corresponding negative opening 75. Referring now to FIG. 15A, note that one edge 76 of the positive bar 74 is in alignment with the corresponding edge 81 of the bar on the underlying negative master symbol. The other edge 77 of the positive bar 74 is shown to be out of alignment with the corresponding edge 78 of the corresponding bar on the underlying negative master symbol.

The operator then adjusts the dial indicator 79 to zero, as shown. He then carefully rotates the knob on the cam and moves the glass support plate to align edge 78 of the negative symbol to be tested with edge 77 of the positive symbol. This situation is shown in FIG. 15B. Note that at this point the opposite edge 81 of the negative is no longer in alignment with the corresponding edge 76 of the positive bar. The deflection 82 on the dial indicator 79 can then be read to determine whether the width of the negative master to be tested is within the allowed tolerance.

It should be noted that this illustrates the typical case where the Universal Product Code bar on the negative is narrower than the corresponding bar on the positive verification symbol because of having been barwidth-reduced. In that situation, the deflection recorded 83 on the dial indicator is a negative (—) value of that referred to above. It should further be noted that a similar method can be used to verify the accuracy of a positive symbol having bar width expansion using a verification negative symbol having no bar width reduction. In this situation, of course, a positive (+) value will be recorded on the dial indicator. This method used to verify the accuracy of the Universal Product Code masters similarly comprises simply aligning edges of all the bars of the negative with the corresponding edges of the bars on the verification master. This is, of course, done for both edges. If light is emitted through any edge of a bar when the other edges are in alignment, then the error in reproduction can be determined in the manner described above.

The apparatus and method of the present invention have been described in respect to particular embodiments thereof. It will be appreciated, however, to those skilled in the art that modification may be made in the apparatus and method according to the invention without exceeding the ambit of its spirit and scope.

What is claimed is:

1. Apparatus for verifying the accuracy of a printed sample with a transparent master symbol, comprising base means having a support surface, means for securing said sample to said support surface, transparent support means for said master symbol, said support means slidably lying over said support surface with the underside of said support means adjacent said support surface, said master symbol secured to the underside of the support means contiguous with the printed sample, guide means secured to the support surface of said base to ensure essentially linear movement of said support means with respect to said base, elongated plunger slidably mounted on said base, one end of the plunger in driving engagement with one edge of the support means, spring loaded dial indicator guage mounted on said base being operably connected to the other end of said plunger, cam mounted on the base operably adjacent to the edge of the support means opposite the plunger, said cam providing movement of the support means relative to the base in a first direction, the spring loaded dial indicator providing linear movement of the support means in a second direction 180° away from said first direction with the dial indicator recording any linear movement of said support means.

2. The apparatus of claim 1, wherein said guide means comprises a plurality of guide pins secured to the underside of said transparent support means, corresponding guide grooves in the support surface of said base parallel to the direction of the elongate axis of the plunger engaging said pins so that said support means moves in a linear direction substantially parallel to the direction of the elongate axis of the plunger.

3. The apparatus of claim 1, further comprising pressure plate, recessed area on the support surface of said base for receiving said pressure plate, plurality of springs between said pressure plate and the base, whereby the pressure plate exerts force on one side of the printed sample to keep the other side of said sample in close contact with the master symbol.

4. An apparatus for verifying the accuracy of a printed sample with a transparent master symbol, comprising base means having a support surface, means for securing said sample to said support surface, transparent support means for said master symbol, said support means slidably lying over said support surface with the underside of said support means adjacent said support surface, said transparent master symbol being secured to the underside of said support means contiguous said printed sample, elongate shaft for movably mounting said support means to said base, plurality of supports for mounting said shaft slidably and rotatably to said base, hinge means connecting said support means to the shaft so that said support means can be moved in a linear direction substantially parallel to the elongate axis of said shaft and can be raised out of the plane of the support surface of said base while still mounted on said base to facilitate attachment of the master symbol, spring loaded dial indicator gauge mounted on said base being operably connected to one end of said elongate shaft, cam mounted on said base operably connected to the other end of said shaft, said cam providing linear movement of the support means in a first direction relative to the base, the spring loaded dial indicator providing linear movement of the support means in a second direction 180° away from said first direction, with the dial indicator recording any linear movement of said support means.

5. The apparatus of claim 4, further comprising pressure plate, recessed area on the support surface of said base for receiving said pressure plate, plurality of springs between said pressure plate and the base, whereby the pressure plate exerts force on one side of the printed sample to keep the other side of said sample in close contact with the master symbol.

6. The apparatus of claim 4, wherein the printed sample to be tested is a Universal Product Code.

7. The apparatus of claim 5, wherein the printed sample to be tested in a Universal Product Code.

8. The apparatus of claim 5, wherein the pressure plate is composed of a transparent material.

9. A master symbol for verifying the accuracy of the bars on a printed Universal Product Code, comprising a transparent sheet of material, interrupted Universal Product Code bars replicated on said transparent sheet, said bars having open spaces to facilitate visual comparison with underlying printed Universal Product Code bars.

10. The master symbol of claim 9, wherein said transparent sheet is composed of a plastic polyester material.

11. Method for measuring the reproduction error in one of a plurality of bars on a sample master Universal Product Code, comprising the steps of providing a verification master symbol, said verification master being a reversal image of said sample, supporting the sample and the verification master in a contiguous relationship with the Universal Product Code bar of the verification master and the corresponding bar of the sample substantially parallel, moving the verification master symbol a first time relative to the sample so that one edge of the bar to be tested on the sample is in alignment with the corresponding edge of the corresponding bar on the verification master, recording the position of said verification master relative to said sample, moving the verification master a second time in a linear direction substantially perpendicular to said Universal Product Code bar to align the other edge of said bar on the sample with the corresponding other edge of the bar on the verification master, and measuring said second movement to quantitatively determine the reproduction error.

12. A system for verifying the accuracy of a printed sample comprising the combination of verifying apparatus and a transparent master symbol, said verifying apparatus comprising a base means having a support surface, means for securing said printed sample to said support surface, transparent support means for said master symbol, said support means slidably lying over said support surface with the underside of said support means adjacent said surface, the transparent master symbol being secured to the underside of said support means contiguous to said printed sample, means for producing relative linear movement between the base means and the transparent support means so that said master symbol can be moved relative to said printed sample to facilitate visual comparison therewith, said transparent master symbol comprising a transparent sheet of material, and a standardized reproduction of the printed sample replicated on said transparent sheet, the indicia of said standardized reproduction being interrupted to provide open spaces therein to facilitate visual comparison with an underlying printed sample.

* * * * *

UNITED STATES PATENT AND TRADEMARK OFFICE
CERTIFICATE OF CORRECTION

PATENT NO. : 4,305,667
DATED : December 15, 1981
INVENTOR(S) : Robert W. Nachtrieb and Carl W. Lindenmeyer It is certified that error appears in the above-identified patent and that said Letters Patent are hereby corrected as shown below:

Front Page, add joint inventor by insertion -- and Carl W. Lindenmeyer, Aurora, Illinois --

Column 3, line 15, he maay, should read -- he may --

Column 4, line 31, It should be noted tht, should read -- It should be noted that --

Column 7, line 21, The dial indicator has a bezel that caan, should read -- The dial indicator has a bezel that can --

Column 9, line 60, the abovementioned, should read -- the above-mentioned --

Column 10, line 56, indicated fo the symbol, should read -- indicated for the symbol --

Column 12, line 57, ple to be tested in a, should read -- ple to be tested is a --

Signed and Sealed this

Twenty-seventh Day of July 1982

[SEAL]

Attest:

GERALD J. MOSSINGHOFF

Attesting Officer    Commissioner of Patents and Trademarks